Sept. 3, 1963

R. S. DITTO 3,102,689

CONTROLLER

Filed May 4, 1962

2 Sheets-Sheet 1

INVENTOR
RICHARD S. DITTO

BY Harry J. McCauley

ATTORNEY 3,102,689
CONTROLLER
Richard S. Ditto, Newark, Del., assignor to E. I. du Pont de Nemours and Company, Wilmington, Del., a corporation of Delaware
Filed May 4, 1962, Ser. No. 192,587
2 Claims. (Cl. 236—46)

This invention relates to an environmental condition controller, and particularly to a two-step cycle environmental condition controller employing a combination of time-proportioning and on-off modes of control. This application is a continuation-in-part of U.S. application Ser. No. 39,703, now abandoned.

The precision requirements for environmental condition control have become increasingly rigorous with the advancement of technology, and it has not been possible to meet the standards imposed with conventional control devices. A typical example is that of a temperature controller involving dynamic heating loads covering the entire range of 70° C. to 350° C. wherein it is imperative that an indicating accuracy of ±1° C. be achieved, together with a sensitivity of at least 0.05° C. Temperature controllers functioning in the on-off mode possess an accurately defined set point but are highly oscillatory, and thus not satisfactory. On the other hand, controllers functioning in the time-proportioning mode have non-oscillatory action but a set point accuracy which is poor, e.g., 5–10° C.

Figure 1:
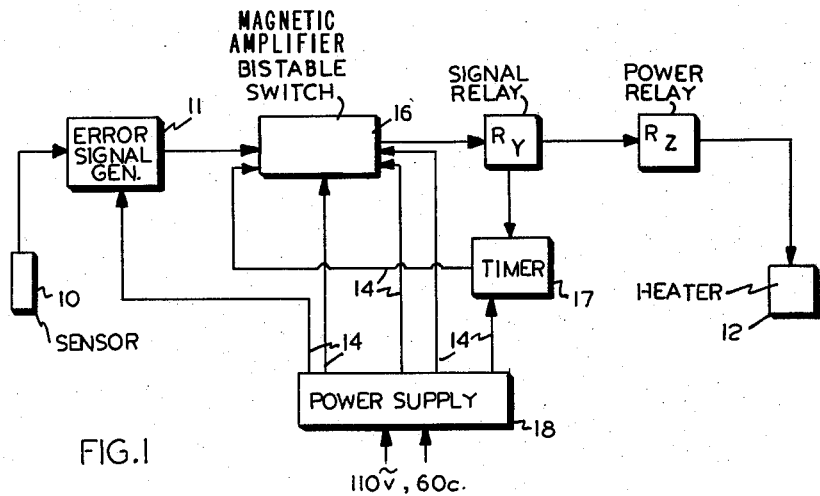
Figure 3:
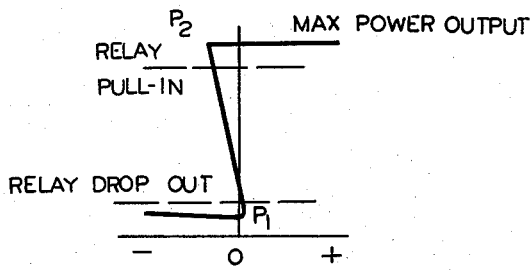
Figure 2:
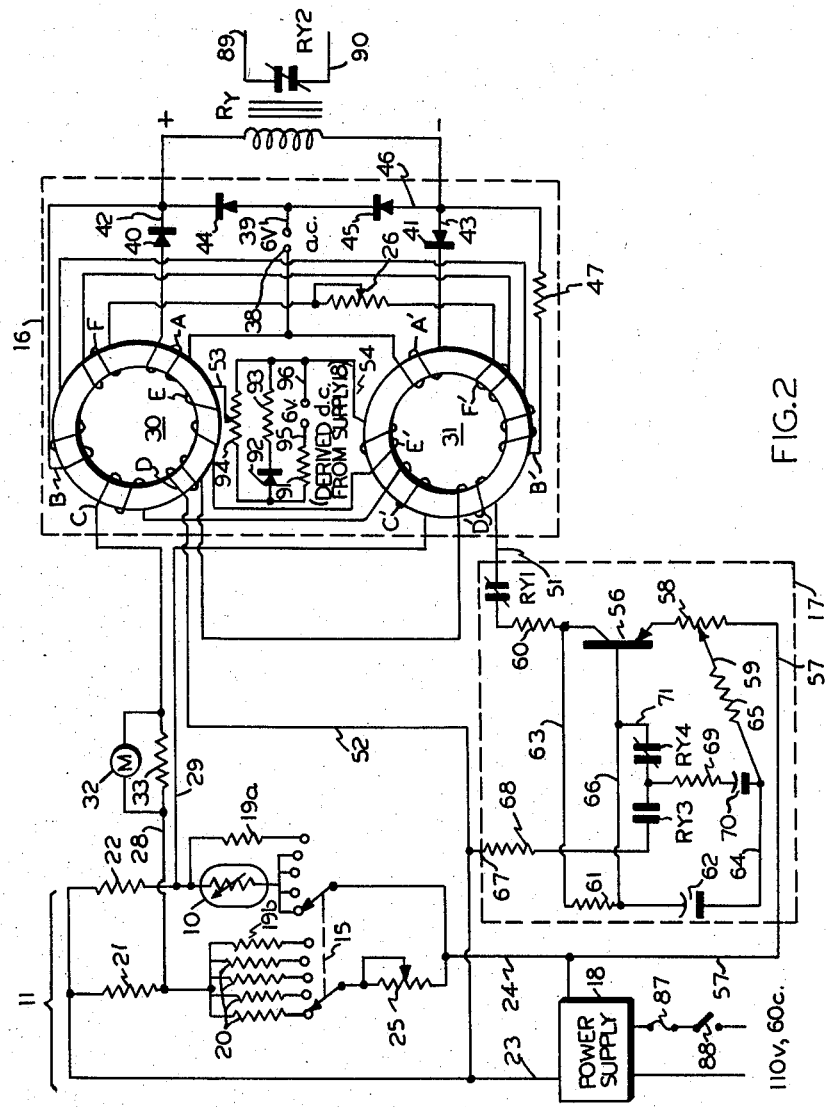

An object of this invention is to provide an improved environmental condition controller which embodies the best features of both on-off control and time-proportioning control. Other objects of this invention are to provide an environmental condition controller which is low in first cost and maintenance, of rugged design, and highly dependable in operation. The manner in which these and other objects of this invention are attained will become evident from the detailed description and the following drawings, in which:

FIG. 1 is a block diagram showing the functional relationship between the various components of a temperature controller constructed according to this invention, FIG. 2 is a somewhat schematic circuit diagram of a preferred embodiment of the temperature controller of FIG. 1, and FIG. 3 is a diagrammatic representation of the transfer characteristic of the magnetic amplifier bistable switch of FIG. 2.

Generally, the controller of this invention is of the two-step cycle type comprising, in combination, means generating an error signal as a function of the difference between a preselected environmental condition set-point and the ambient condition level sensed in the location as to which control of said environmental condition is desired, a powered transient current circuit of preselected time constant provided with means maintaining the "on" time of said controller in inverse proportion to substantially the immediately preceding "off" time, a magnetic amplifier bistable switch in electrical circuit independently with the means generating the error signal and with the transient current circuit so as to be responsive to the error signal solely for the effectuation of the first step of said cycle of the controller and to the time runout of the transient current circuit solely for effectuation of the second step of said cycle of the controller, and means in the transient current circuit responsive to operation of the magnetic amplifier bistable switch in the effectuation of the first step of said cycle initiating the timing cycle of the transient current circuit at a preselected point in which the controller is actuated to the second step of said two-step cycle.

It will be understood that the controller of this invention is adapted to the control of any two-step cycle of operation such as, for example, the regulation of the existing fluid pressure in a compartment, the maintenance of a given level of a liquid in a vessel, the control of temperature at a given location as by heat exchange to or from the location in the case of heating or refrigeration, respectively, and many other analogous environmental condition regulation situations. For convenience in description, as well as from the standpoint of the importance of the application, the invention is described in detail with respect to a temperature controller adapted to maintain a temperature at some level substantially above room temperature. Accordingly, in this instance heat exchange is being made to the location, as distinguished from heat withdrawal for the case of refrigeration.

Referring to FIG. 1, the functional relationship of the several components of my controller are portrayed, the interconnecting lines provided with arrow heads indicating the direction of control imposition from one component upon another.

The physical limits of the location whose temperature is to be controlled are not delineated in FIG. 1; however, this location can be a compartment, a heated roll, or any other identity the temperature of which must be maintained within close limits. This location is provided with a sensor 10, such as a temperature-sensitive resistor, which can be a platinum resistance gage, as an example, which is adapted to sense the ambient temperature at the location and communicate this intelligence to an appropriate error signal generator 11 so that heater 12, servicing the location, is turned on if the temperature in the location has dropped below the desired level. This operation is effected through a magnetic amplifier bistable switch 16 which energizes a signal relay, $R_y$, which, in turn, energizes a power relay, $R_z$, to actually turn heater 12 on. This completes the initiation of the heating cycle and it will be particularly understood that commencement of heating is solely under the control of error signal generator 11.

Disestablishment of heating is effected solely by timer 17, the powered transient current circuit of preselected time constant, as indicated by the input line returned to magnetic amplifier bistable switch 16, the timer, however, commencing its timing cycle responsive to the energization of signal relay $R_y$. The several components of the apparatus which are powered are denoted by upwardly directed lead lines 14 and, conveniently, all operating power can be supplied from a central source 18 with input connected across the customary 110 v., 60 c. mains.

A preferred embodiment of this invention is shown in FIG. 2 and utilizes a conventional Wheatstone bridge as the error signal generator 11, wherein a resistance gage serves as sensor 10, while the opposite arm of the bridge includes four range selector resistors 20 which are switched in at personal option to adjust bridge operation to the temperature range desired. The bridge is completed by resistors 21 and 22, and is supplied with 6 v. D.-C. power from power source 18 through leads 23 and 24. The specific temperature level preselection within a given range selector resistor 20 is facilitated by provision of an adjustable set-point resistor 25 connected in series circuit with resistors 20. Set-point resistor 25 is preferably of conventional design incorporating a dial (not shown) inscribed peripherally with a temperature scale and adapted to be attached to the set-point resistor shaft so as to indicate any preselected shaft setting by reference to a fixed pointer mounted adjacent the dial face. Resistors 19a in shunt connection with sensor 10 and 19b in shunt connection with range selector resistors 20 are provided for calibration purposes, and gang arm 15 connecting the two switch arms running to common lead 24 is an aid to controller operation.

The error signal output of the bridge is supplied through leads 28 and 29 to the magnetic amplifier bistable switch, indicated generally at 16, which is shown in partially schematic representation by ring cores 30 and 31, each provided with six individual windings, the magnetic amplifier being operated in the switching mode. Although not required for calibration or operation, it is preferred to provide a null meter 32 connected in shunt across a resistor 33, whereby a portion of the output current of the bridge can be measured, thereby indicating any temperature deviation from the bridge set point value. This meter can concurrently serve as a visual monitor by inclusion in the circuit of "high-low" temperature limit lights, not shown.

The magnetic amplifier is provided with load windings A and A' for cores 30 and 31, respectively, connected in parallel relationship and supplied with operating power, typically 6 v. A.C., from leads 38 and 39. Windings B and B' are positive feedback windings, connected in series relationship to the amplifier load, which is the coil of signal relay $R_y$. The windings are maintained in proper polarity by diodes 40 and 41 in the power output leads 42 and 43, respectively, and by diodes 44 and 45 in feedback completion conductor 46. 47 is a current-limiting resistor for the feedback circuit. C and C' are the switch-on control windings connected in series relationship through which the error signal from the bridge is imposed via leads 28 and 29. D and D' are the control switch-off windings connected in series relationship with one another and through leads 51 and 52 with timer 17. Windings E and E' are bias windings typically energized by 6 v. D.C. derived through leads 53 and 54. Windings E and E' are bias windings provided for the elimination of effects of supply voltage variations on the temperature controller which are energized by 6 v. D.C. derived through the network hereinafter described from the common power supply 18, but shown for convenience in representation in the drawing as a pair of independent terminals. The bias circuit lead 53 is connected to the tap of voltage divider 94 and a branch connection is provided in parallel with the divider which includes silicon voltage regulator diode 92 and resistor 93. Lead 95 in series with resistor 91 connects the power source directly with the diode, while lead 96 completes the electrical circuit to the other side of the network. Finally, windings F and F' are provided, these being time lag regulatory bias windings for the magnetic amplifier, which are powered by induction from cores 30 and 31 and are in closed circuit with a proportional band adjustment resistor 26.

A preferred design of transient current timing circuit, indicated generally at 17, is that taught in application Ser. No. 39,573, filed of even date with parent application Ser. No. 39,703, now abandoned, hereinbefore referred to. This incorporates a PNP transistor 56 with a current gain of preferably at least 100, which is employed as an amplifying device deriving its D.C. power from source 18 through lead 57.

Transistor 56 is in common-emitter type connection with its emitter element connected in series with a potentiometer indicated generally at 58 (typically 1000 ohms, 2 watts), the tap 59 of which is set to obtain a preselected time interval as hereinafter described. The collector element is in series connection with output resistor 60 (typically 1500 ohms, 1 watt). The time delay circuit consists of the two elements, charging resistor 61 (typically 150,000 ohms, 1 watt) and capacitor 62 (typically 250 mfd., 25 v.), series-connected in shunt from a point between resistor 60 and the collector element of transistor 56 by lead 63 to the potentiometer tap 59 via lead 64. Resistor 65 is a discharge resistor (e.g., 470 ohms, 1 watt) which is not part of the time delay circuit but is usually incorporated in the tap as a design convenience. A feedback connection 66 is provided running from a point between resistor 61 and capacitor 62 of the time delay circuit and the base element of transistor 56. An actuating switch for the timing circuit is provided in the form of a set of relay contacts $R_{y1}$ in the transistor power circuit.

The timing circuit is provided with a branch electrical circuit having lead 67 running from power supply lead 52 to lead 64. This circuit includes, in series connection, charging resistor 68 (typically 150,000 ohms, 1 watt), a set of relay contacts responsive to relay $R_y$ denoted $R_{y3}$, a discharge resistor 69 (typically 10,000 ohms, 1 watt) and a capacitor 70 (typically 250 mfd., 25 v.). In addition, the branch circuit is provided with a lead 71 connected between the feedback connection 66 and relay contacts $R_{y3}$, provided with a pair of relay contacts $R_{y4}$ responsive to relay $R_y$ of a type reversely operating with respect to contacts $R_{y3}$, so that one is in closed circuit condition when the other is in open circuit condition.

As is conventional practice, an overload fuse 87 and a main power switch 88 are provided on the input side of power supply 18. The output pair of contacts for relay $R_y$ is $R_{y2}$, connected in circuit with a power relay such as $R_z$ of FIG. 1, not shown in FIG. 2, through leads 89 and 90. FIG. 2 shows the positions of all four sets of relay contacts hereinbefore described for the "on" condition of the timing circuit cycle hereinafter described.

A typical controller adapted to service in the range 70° C.–350° C. with an indicating accuracy of ±1° C. and a controller sensitivity of at least 0.10° C. utilized circuit elements as follows:

Sensor 10—Type $R_g$–SN–1 Stikon resistance gage (A. C. Ruge Associates, Cambridge, Mass.)
Bistable switch 16—2 core saturable reactor

*Bridge Resistors: All 0.25% Tolerance*

Calibrating resistor 19a—153 ohms
Calibrating resistor 19b—220 ohms
Resistors 20—143, 220, 298, and 376 ohms, respectively
Resistor 21—255 ohms
Resistor 22—120 ohms
Resistor 25—helipot potentiometer, 100 ohms, 1% tolerance, 0.5% linearity, Type 100G
Resistor 26—500 ohms, 2 watt potentiometer
Meter 32—millivoltmeter 12–0–12 millivolts, 100 ohms resistance
Resistor 33—68 ohms, 1 watt, 10% Ohmite
Diodes 40, 41, 44, and 45—Type 1N34A, Radio Receptor, Inc.
Resistor 47—2200 ohms, ½ w. I.R.C. Precision Type
Transistor 56—Type GT–82, General Transistor Corp.
Resistor 91—2200 ohms
Diode 92—typically a 1N482 Transitron Silicon Diode
Resistor 93—220 ohms
Voltage divider 94—250 ohms In the construction of the apparatus of this invention it is necessary that the temperature v. resistance characteristic of sensor 10 be known to a high precision. The resistance of calibrating resistor 19a is then preselected to be precisely equal to the resistance of sensor 10 at a given temperature which is generally chosen to be within, or close to, the range of temperatures in which the controller is intended to operate.

Prior to operation of the apparatus, it is necessary to calibrate in accordance with the following sequence:

(1) First, gang switch 15 is turned to calibrating position, i.e., with resistors 19a and 19b in the bridge circuit.
(2) Second, set-point resistor 25 is adjusted until meter 32 reaches a null position.
(3) Third, the inscribed dial associated with set-point resistor 25 is adjusted until the scale division opposite the fixed pointer corresponds to a temperature reading equivalent to the resistance of resistor 19a. The dial is then locked on to the set-point resistor shaft.
(4) Fourth, set-point resistor 25 is then adjusted to increase the dial reading by about ½° C., whereupon meter 32 no longer indicates null.

(5) Fifth, the bias applied via windings E and E' is adjusted by appropriate setting of voltage divider 94 until the controller energizes the relays $R_y$ and $R_z$ (FIG. 1), and hence the heater load, within an interval of about 15 secs.

(6) Sixth, set-point resistor 25 is restored to its initial setting, i.e., it is backed off the ½° C. calibration setting of the fourth step summarized herein. The relays now are de-energized and power remains off indefinitely.

With this, calibration is completed and gang switch 15 is restored to one of the four operative positions shown in FIG. 2, which simultaneously switches into the bridge circuit a preselected one of the range selector resistors 20 as well as sensor 10.

Thereafter, the operation entails preselecting the level of temperature regulation by merely switching in the appropriate resistor 20 in bridge circuit 11, whereupon the resulting error signal is impressed on control windings C and C' of the magnetic amplifier. The transfer characteristic of the amplifier is schematically represented in FIG. 3. The input is applied along the lower line having the point of inversion $P_1$, and it will be seen that a negative polarity bridge output has absolutely no effect on operation. As soon, however, as the polarity of the error signal becomes slightly positive, e.g., one millivolt, the power output of the magnetic amplifier rises to maximum at point $P_2$, at the same time going slightly negative as is the characteristic of this type of apparatus.

Immediately, full power is applied to the coil of $R_y$ through load windings A—A', pulling in the relay and closing the pairs of relay contacts, $R_{y1}$ and $R_{y4}$ in the timer circuit and $R_{y2}$ in the signal relay circuit. The latter energizes the power relay $R_z$ of FIG. 1 and switches heater 12 on. Contacts $R_{y1}$, on closing, by impressing substantially the full voltage from source 18 across charging resistor 61 and capacitor 62, starts to build up the charge on capacitor 62 at a rapid rate. However, as charging proceeds, the feedback bias applied through 66 to the base element of transistor 56 increases the flow of current through the transistor. This current divides, so that a small fraction of it passes through 61, as compared to the amount passing 60 at any given time, since resistor 60 possesses the lower resistance value. Accordingly, a progressively lower value of charging voltage is applied to the R-C time delay circuit and the charging rate, while still exponential with time, falls off. Eventually, the current passing through resistor 60 to windings D and D' reaches such a high level that magnetic amplifier 16 is switched "off," at which point in time relay contacts $R_{y1}$ and $R_{y2}$ open. Opening of $R_{y1}$ causes the input resistance to the transistor to drop to essentially that of the portion of potentiometer 58 switched in circuit therewith by tap 59. Capacitor 62 then discharges through resistor 65, which latter serves a discharge current limiting function.

The foregoing describes the operation of a timing circuit having no branch electrical circuit inclusive of lead 67, resistor 68, relay contacts $R_{y3}$, $R_{y4}$, resistor 69, and capacitor 70. Turning now to this, the operation of the timing circuit is qualified by the superposed effect of resistor 68-capacitor 70 in the following manner. When relay $R_y$ stands de-energized, contacts $R_{y3}$ are closed (and $R_{y4}$ open) and capacitor 70 charges through the branch circuit of lead 67-resistor 68 by application of the full voltage of D.-C. source 18 thereacross. As in a conventional R-C circuit, the voltage across capacitor 70 increases exponentially.

When an error signal of sufficient magnitude passes from bridge 11 to magnetic amplifier 16, relay $R_y$ is energized, thereupon opening contacts $R_{y3}$ and closing contacts $R_{y4}$, $R_{y2}$ and $R_{y1}$ as shown in FIG. 2. This places capacitor 70 in parallel with capacitor 62 through discharge resistor 69. Since the initial voltage across capacitor 62 was zero, and capacitor 70 stands charged to some to some finite voltage, current flows from capacitor 70 through resistor 69 to capacitor 62. This results in a precharging of the parallel-connected capacitors, with the result that the timing period is now decreased over the condition without a branch circuit by an amount proportional to the voltage existing across capacitor 70 at the instant the error signal is applied. Thus, the branch circuit-modified timer provides a timing period which is inversely proportional to the elapsed time between de-energization of relay $R_y$ and the application of the signal from bridge 11 or, expressed in another way, the "on" time of the timing circuit is an inverse function of the "off" time of the magnetic amplifier bistable switch 16 controlled by the timing circuit.

This has obvious advantages in eliminating wide swings of the controlled variable around a given set-point since, if the bistable switch has been "off" for a relatively long interval immediately prior to the receipt of an effective error signal, it is plain that only a relatively small application of heating power should normally be required to restore the temperature to the set-point. If, on the other hand, extraneous factors have intruded upon the control environment which make this not the case, the very next cycle of operation will operate to correct the deficiency by supplying a heat amount in inverse proportion to the time separation between the two last cycles of operation. This action makes for very high stability as well as accommodation of relatively wide load variations, together with extremely accurate temperature regulation as hereinbefore mentioned. Moreover, the controller proportions the "off" time over a relatively small change in the controlled variable. Thus, heating power is proportioned over the full range from 0–100% within a sensed temperature change of less than 2° C.

The transistor timing circuit hereinbefore described is particularly preferred because of its very wide control range, which thus enlarges the range of adjustability of available time control intervals. Also, the magnetic amplifier bistable switching device is advantageous because of an automatic time proportioning feature which is inherent in its operation. This consists of the speed of the switching action as a function of the magnitude of the error signal which brings about the switching. That is, within limits, the smaller the error signal output of the bridge, the longer the time required in going from point $P_1$ through $P_2$ during the transfer action depicted in FIG. 3. With a large error signal, this transfer is effected practically instantaneously and power is at once applied to heater 12 of FIG. 1, thus insuring minimum delay in going from the cold state to the desired control temperature. Once the control temperature is reached, however, transfer of the magnetic amplifier bistable switch may require as long as 15 seconds for a very low magnitude error signal, which is very appreciable when compared with a heat-on interval of 10 secs., a quite typical duration. This automatic regulatory action has been found to be highly desirable, in that it effects a time proportioning mode of control.

The environmental condition controller of this invention can be modified in numerous respects, such as, for example, by generation of an error signal through the use of additional control windings in the magnetic amplifier, as a substitute for bridge 11, if desired. It will also be evident that relay $R_y$ can itself be replaced by a magnetic amplifier, or by a conventional transistor or vacuum tube counterpart. And, of course, the timing circuit can be modified extensively in ways known to the art.

From the foregoing it will be apparent that this invention consists of an environmental controller of improved characteristics which can be modified in numerous respects within the skill of the art, and it is intended to be limited only by the scope of the appended claims.

What is claimed is:

1. A two-step cycle electrical controller comprising in combination means generating an error signal as a function of the difference between a preselected environmental condition set-point and the ambient condition level sensed in the location as to which control of said environmental condition is desired, a powered transient current circuit of preselected time constant provided with means maintaining the "on" time of said controller in inverse proportion to substantially the immediately preceding "off" time, a magnetic amplifier bistable switch in electrical circuit independently with said means generating said error signal and with said transient current circuit so as to be responsive to said error signal solely for the effectuation of the first step of said cycle of said electrical controller and to the time runout of said transient current circuit solely for effectuation of the second step of said cycle of said electrical controller, and means in said transient current circuit responsive to operation of said magnetic amplifier bistable switch in said effectuation of said first step of said cycle initiating the timing cycle of said transient current circuit at a preselected point in which said controller is actuated to said second step of said two-step cycle.

2. An electrical controller according to claim 1 wherein said powered transient current circuit of preselected time constant is an R-C circuit shunted by a second R-C circuit charging during the step of said two-step cycle electrical controller when said first R-C circuit is discharging, said second R-C circuit maintaining said "on" time of said controller in inverse proportion to substantially said immediately preceding "off" time of said controller.

References Cited in the file of this patent
UNITED STATES PATENTS
2,838,644     Rolfson et al. _____ June 10, 1958